United States Patent
Partington et al.

[11] Patent Number: 5,984,419
[45] Date of Patent: Nov. 16, 1999

[54] AUTOMOTIVE SEAT BACK

[75] Inventors: Eric Partington, Troy; Todd A. Mysliwiec, Allen Park; Rich Sanders, Clarkston; Stephen Lambrecht, New Hudson; Philip W. Leistra, III, Birmingham, all of Mich.

[73] Assignee: Lear Corporation, Southfield, Mich.

[21] Appl. No.: 09/027,518

[22] Filed: Feb. 20, 1998

Related U.S. Application Data

[63] Continuation-in-part of application No. 08/705,420, Aug. 29, 1996, Pat. No. 5,782,537
[60] Provisional application No. 60/007,548, Nov. 27, 1995, and provisional application No. 60/016,775, May 7, 1996.

[51] Int. Cl.[6] .......................... A62B 35/00; B60R 21/00; B60R 22/12
[52] U.S. Cl. .................. 297/473; 297/468; 297/483; 297/452.18; 297/452.65; 297/216.13
[58] Field of Search .................... 297/473, 483, 297/468, 452.18, 216.13, 452.65

[56] References Cited

U.S. PATENT DOCUMENTS

| | | | |
|---|---|---|---|
| Re. 34,051 | 9/1992 | Deegener et al. | 297/468 |
| 3,663,057 | 5/1972 | Lohr et al. | 297/483 X |
| 4,076,306 | 2/1978 | Satzinger | 297/216.13 |
| 4,431,233 | 2/1984 | Ernst | 297/483 X |
| 4,749,231 | 6/1988 | Cremer et al. | 297/483 X |
| 4,804,226 | 2/1989 | Schmale | 297/483 |
| 5,022,677 | 6/1991 | Barbiero | 297/483 X |
| 5,088,794 | 2/1992 | Iwami et al. | 297/483 |
| 5,219,202 | 6/1993 | Rink et al. | 297/216.13 |
| 5,246,271 | 9/1993 | Boisset | 297/483 X |
| 5,253,924 | 10/1993 | Glance . | |
| 5,310,247 | 5/1994 | Fujimori et al. | 297/452.18 X |
| 5,318,341 | 6/1994 | Griswold et al. | 297/483 X |
| 5,364,170 | 11/1994 | West | 297/483 |
| 5,390,982 | 2/1995 | Johnson et al. | 297/483 X |
| 5,447,360 | 9/1995 | Hewko et al. | 297/452.18 |
| 5,452,941 | 9/1995 | Halse et al. | 297/483 X |
| 5,468,050 | 11/1995 | Hall et al. | 297/452.18 X |
| 5,468,053 | 11/1995 | Thompson et al. | 297/452.18 X |
| 5,599,070 | 2/1997 | Pham et al. | 297/483 X |
| 5,746,476 | 5/1998 | Novak et al. | 297/483 X |
| 5,782,537 | 7/1998 | Leistra et al. | 297/473 |
| 5,851,055 | 12/1998 | Lewis | 297/483 |

*Primary Examiner*—Peter M. Cuomo
*Assistant Examiner*—Rodney B White
*Attorney, Agent, or Firm*—MacMillan, Sobanski & Todd, LLC

[57] ABSTRACT

An automotive seat back having a pair of spaced upright members with lower ends and upper ends interconnected by a cross member to define a substantially rectangular back frame. The upright members and the cross member also have a front surface and a rear surface. A shoulder belt housing extends upwardly between the upright members from below the cross member to an upper distal end disposed above the cross member. The shoulder belt housing also extends forward of the front surfaces of the upright members and the cross member. Specifically, the front surfaces define a frontal plane of the back frame and the distal end of the shoulder belt housing extends forwardly beyond the frontal plane of the back frame. The housing includes a coffin portion, defined by side walls and a bottom, and a cover disposed over and in sealing engagement with the side walls. A seat belt passes within the coffin portion and out through an opening in the cover to overlay a front surface of the seat back.

18 Claims, 6 Drawing Sheets

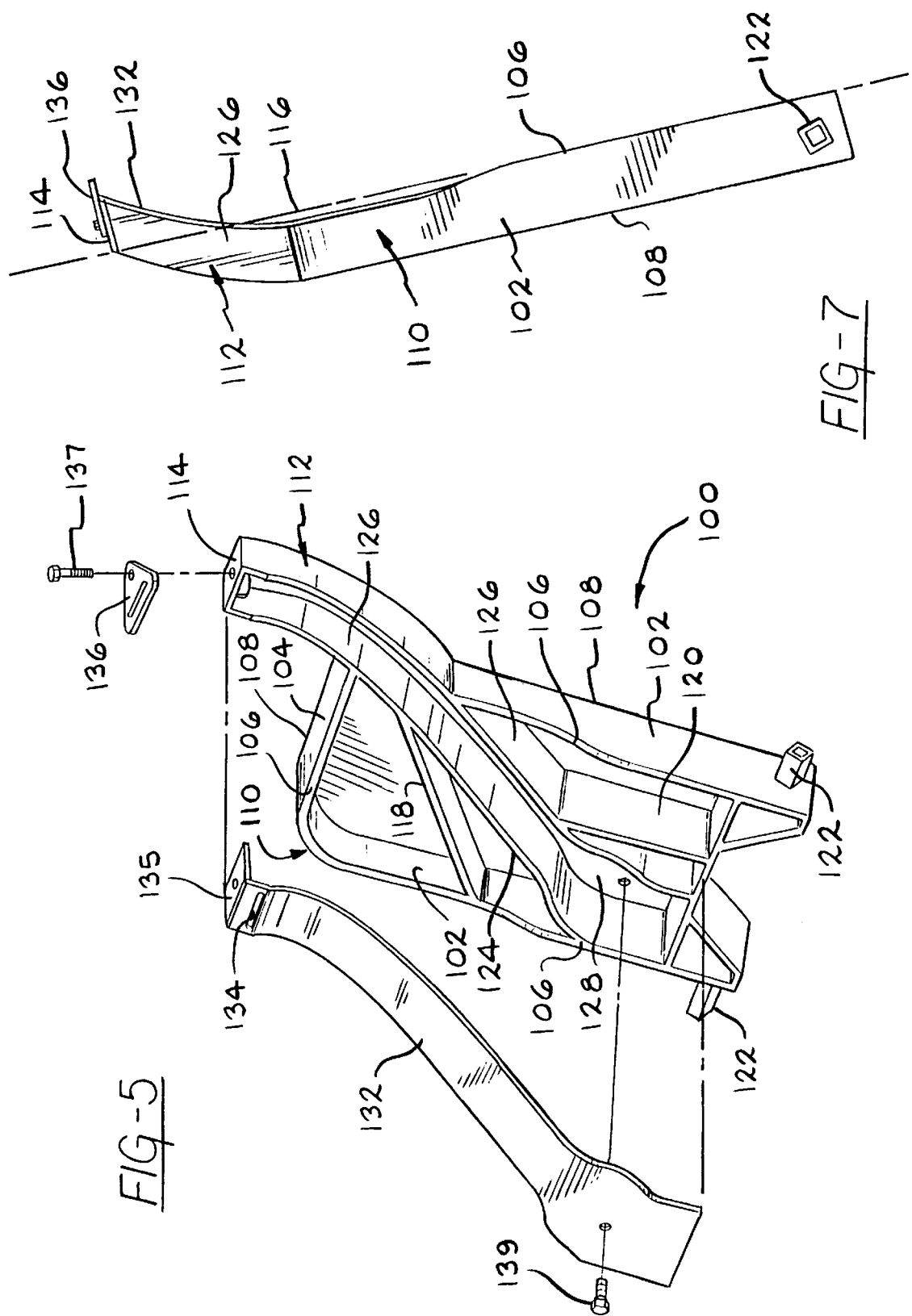

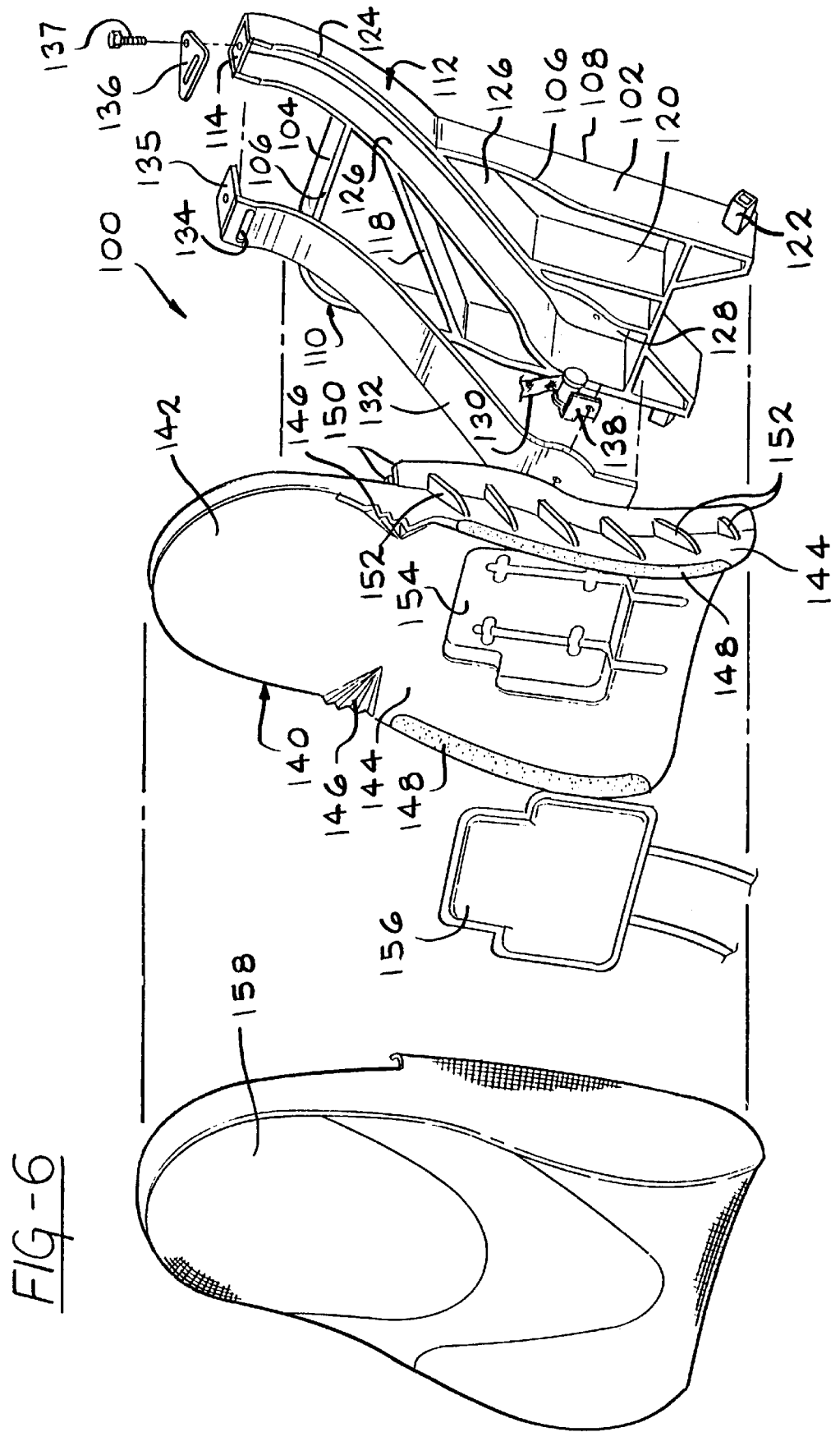

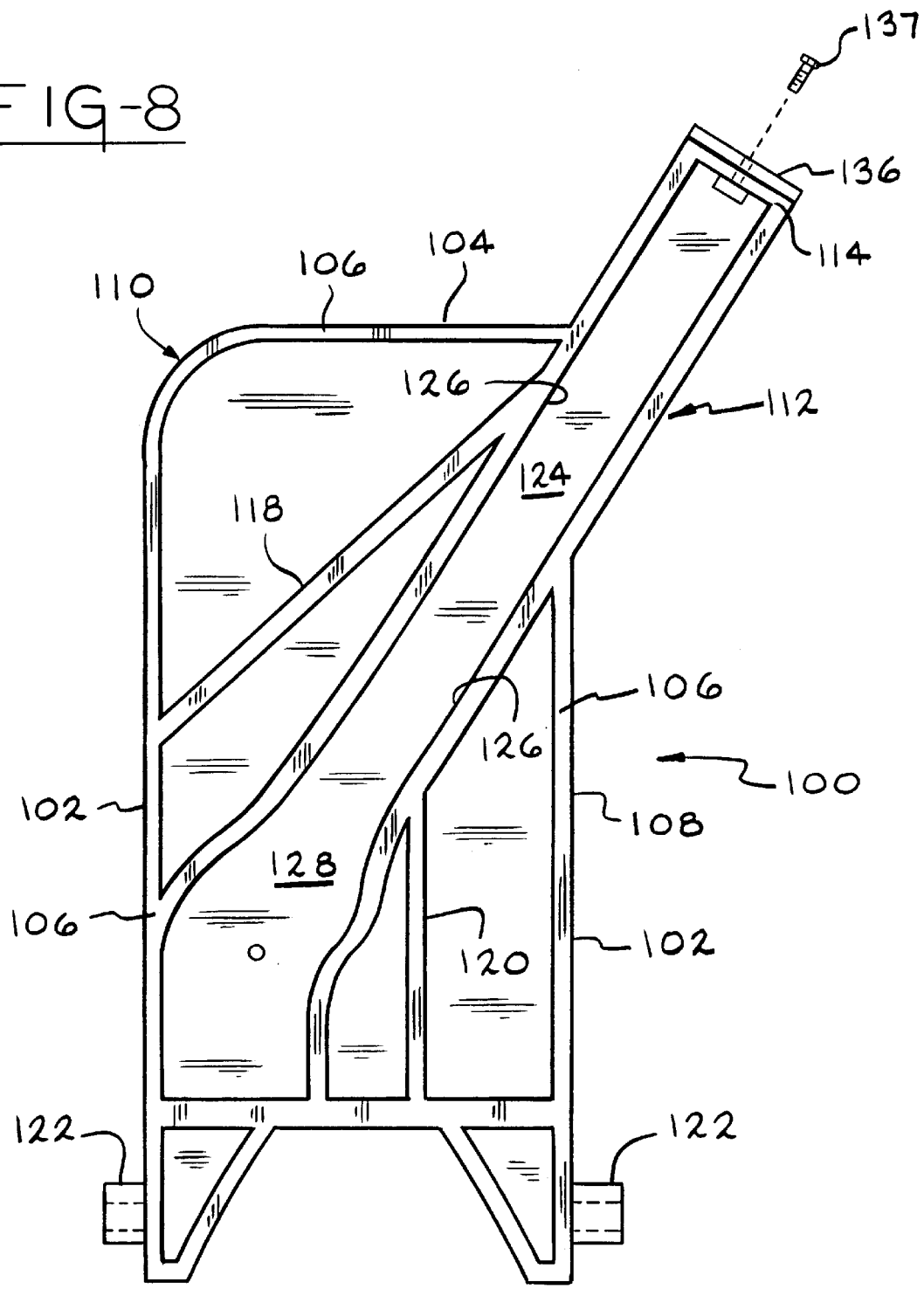

5,984,419

AUTOMOTIVE SEAT BACK

RELATED APPLICATIONS

This application is a Continuation-In-Part of U.S. patent application Ser. No. 08/705,420, filed on Aug. 29, 1996, now U.S. Pat. No. 5,782,537 which in turn claims the benefits of U.S. Provisional Patent Application Ser. No. 60/007,548, filed on Nov. 27, 1995, and U.S., Provisional Patent Application Ser. No. 60/016,775, filed on May 7, 1996.

BACKGROUND OF THE INVENTION

This invention relates in general to automotive seat assemblies and, more specifically, to the seat back of a seat assembly.

To improve both the comfort and performance of seat belt restraint systems, seat assemblies are being developed which have the belt restraint system mounted to the seat rather than to the vehicle body. This improves comfort and performance of the restraint system by maintaining the belt anchor points in fixed positions relative to the seat occupant, regardless of the adjusted position of the seat within the vehicle body.

When the seat belt restraint system is mounted to a seat as opposed to being mounted directly to the vehicle body adjacent the seat, it is necessary for the shoulder belt to be packaged within the seat back. Examples of such systems are disclosed in U.S. Pat. No. 3,663,057 to Lohr et al; U.S. Pat. No. 4,431,233 to Ernst; U.S. Pat. No. 4,749,231 to Cremer et al; U.S. Pat. No. 4,804,226 to Schmale; U.S. Pat. No. 5,452,941 to Halse et al; and U.S. Pat. No. 5,468,053 to Thompson et al. The packaging of the shoulder belt assembly in the seat back must coordinate with the trim components placed upon the seat back for aesthetic purposes and for the comfort of the occupant. One deficiency with these types of seat belt restraint systems is that the occupant may have difficulty accessing the shoulder belt extending from the seat back.

SUMMARY OF THE INVENTION

This invention relates to An automotive seat back assembly comprising a pair of spaced upright members each having lower ends and upper ends. A cross member extends between the upper ends of the upright members. The upright members and the cross member define a back frame. Each of the spaced upright members and the cross member have a front surface and a rear surface. A shoulder belt housing has a lower end and an upper distal end. The lower end is disposed between the upright members and below the cross member of the back frame. The shoulder belt housing extends upwardly from below the cross member to the distal end disposed above the cross member and the distal end of the shoulder belt housing extends outwardly forward from the front surfaces of the upright members and the cross member. Specifically, the front surfaces of the spaced upright members and the cross member define a frontal plane of the back frame. The distal end of the shoulder belt housing extends beyond this frontal plane of the back frame.

Accordingly, the subject invention provides for a seat back assembly having a forwardly curved shoulder belt housing which allows an occupant to easily access a seat belt extending from the seat back.

Various objects and advantages of this invention will become apparent to those skilled in the art from the following detailed description of the preferred embodiment, when read in light of the accompanying drawings.

BRIEF DESCRIPTION OF THE DRAWINGS

FIG. 5 is a perspective view of an additional embodiment of the seat back;

FIG. 6 is a perspective view of the support components of the front seat assembly employing the seat back of FIG. 5;

FIG. 7 is a side view of the seat back of FIG. 5; and

FIG. 8 is a front view of the seat back of FIG. 5.

DETAILED DESCRIPTION OF THE PREFERRED EMBODIMENT

Figure 1:
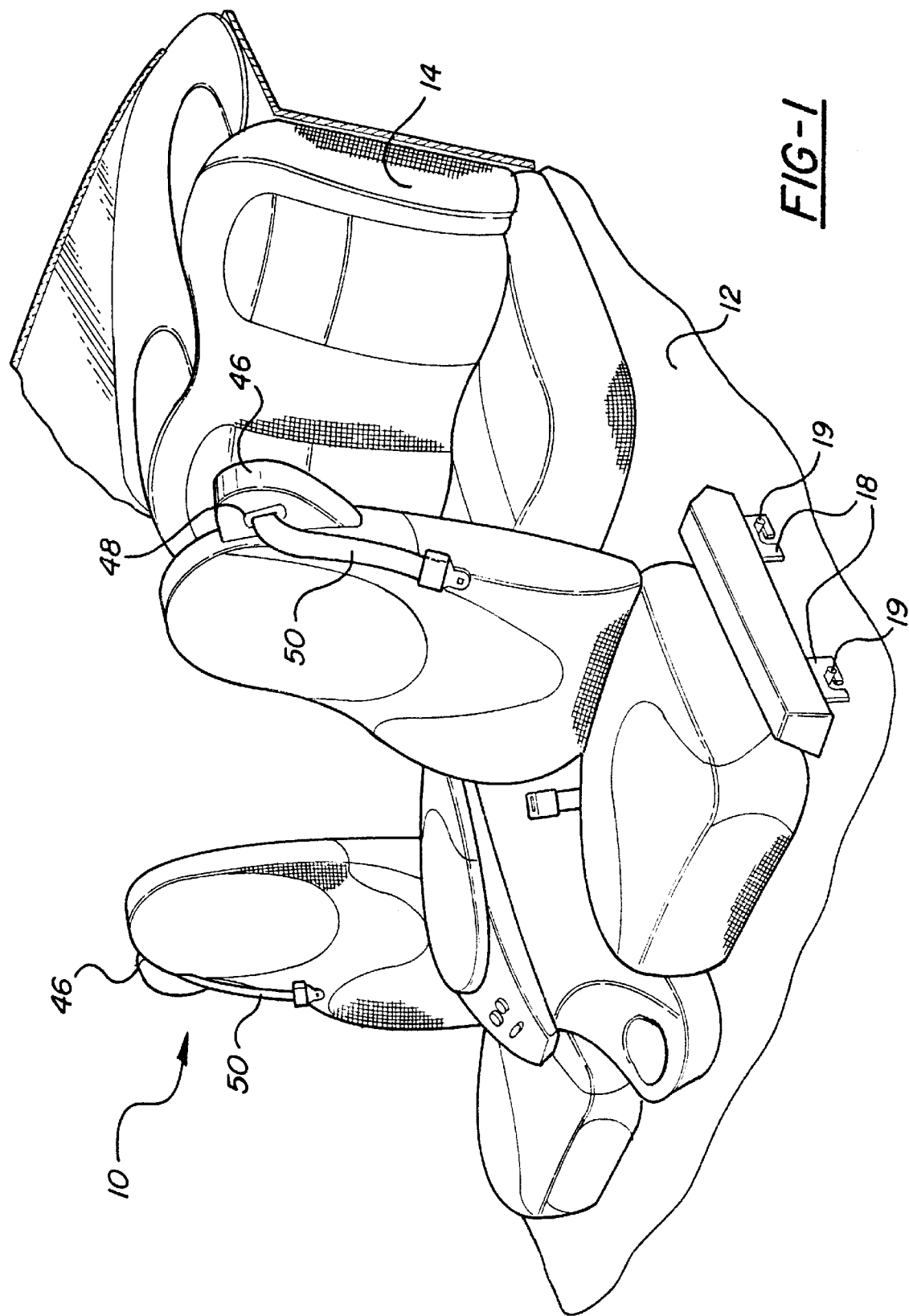
FIG. 1 is a perspective view of the interior of a vehicle showing a front seat assembly employing the subject invention.

Referring now to the drawings, there is illustrated in FIG. 1 a front seat assembly is generally shown at 10. The assembly 10 is to be installed as a unit in a vehicle 12 in front of a rear seat assembly 14.

The seat assembly 10 comprises two seats with each including a pair of fixed rails 16 extending fore and aft and being laterally spaced across the vehicle 12 from one another. A plurality of brackets 18 and 20 are attached by rivets 22, spot welds, or the equivalent, to the fixed rails 16 for attachment to the vehicle 12. Preferably, the brackets 18 include L-shaped slots which latch onto hooks 19 which extend from the vehicle 12. A slide rail 24 is supported by each of the fixed rails 16 for fore and aft movement relative to the fixed rails 16. The fixed rails 16 comprise C-shaped channels having openings 26 which face one another and the slide rails 24 are slideably disposed in the C-shaped channels defining the fixed rails 16. Although not shown, roller or ball bearings may support the slide rails 24 in the fixed rails 16.

A pair of front 28 and rear 30 cross beams interconnect the slide rails 24 for supporting all of the remaining components of a first seat supported totally on the cross beams 28 and 30. The cross beams 28 and 30 extend through the openings 26 in the C-shaped channels defining the fixed rails 16 with the ends thereof attached to the slide rails 24, which are disposed inside the C-shaped channels. A seat support pan 36 is supported on the cross beams 28 and 30. The specifics of the seat pan 36 and the underlying framework form the subject matter of an independent invention disclosed and claimed in co-assigned, co-pending patent application Ser. No. 08/705,513, herein incorporated by reference.

A pair of seat back flanges 32 support a seat back, generally indicated at 34. The rear cross beam 30 has an irregular cross section and each of the seat back flanges 32 has an irregular or triangular opening complementary to and surrounding the rear cross beam 30 for supporting the seat back 34 on the rear cross beam 30. Appropriate pivot pins 38 interconnect the seat back 34 and the flanges 32 for reclining movement of the seat back 34. The specifics of the reclining mechanism for the seat back 34 form the subject matter of an independent invention disclosed and claimed in co-assigned, co-pending patent application Ser. No. 08/705, 422, herein incorporated by reference. The subject invention is directed to the automotive seat back 34 which comprises a pair of spaced upright members 40 each having lower ends rotatably supported on the pivot pins 38. In other words, the pivot pins 38 define mounting means at the lower ends of the upright members 40 for mounting the seat back 34 to the flanges 32 of the seat frame. The upright members 40 have upper ends interconnected by a cross member 42 extending between the upper ends.

A shoulder belt housing 44 extends upwardly between the upright members 40 from below the cross member 42 to a distal end 46 disposed above the cross member 42. The shoulder belt housing 44 defines a belt opening 48 for guiding a shoulder belt 50. The opening 48 is disposed vertically above one of the upright members 40 for positioning the shoulder belt 50 over the shoulder of an occupant. As shown, the belt opening 48 is positioned outside the area between the upright members 40.

The seat back 34 includes crisscrossing truss elements 52 interconnecting the upright members 40 and the housing 44. The truss elements 52 suspend the housing 44 within the periphery of the seat back as defined by the upright members 40 and the cross member 42. Preferably, the upright members 40 and the cross member 42 and the truss elements 52 and the housing 44 are all integrally formed of a homogeneous material, such as being die cast of magnesium.

Figure 3:
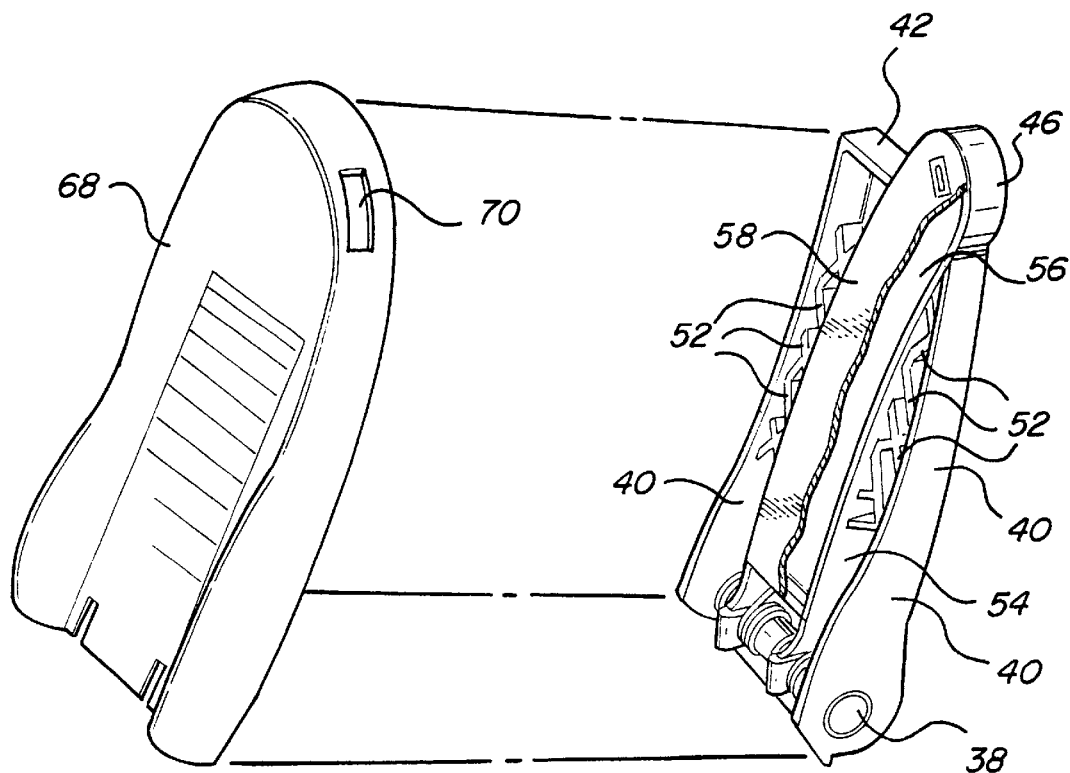
FIG. 3 is an exploded perspective view of the seat back of the subject invention.
Figure 4:
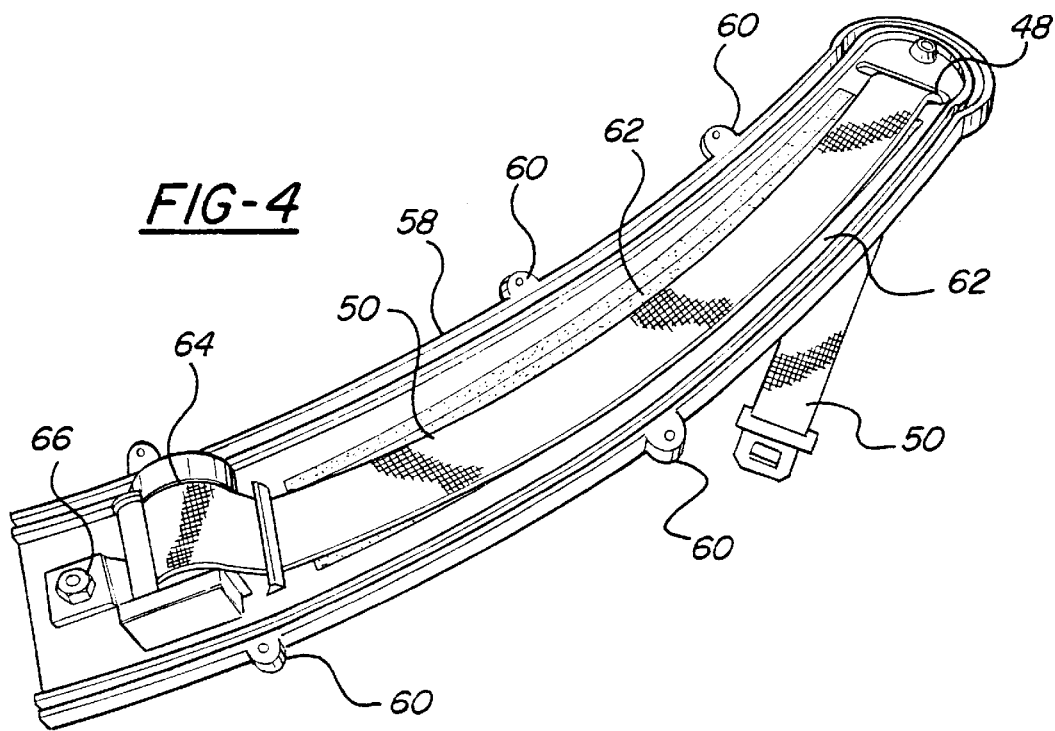
FIG. 4 is a perspective view of the cover of the shoulder belt housing and shoulder belt employed in the seat back of the subject invention.

The housing 44 includes a lower end disposed midway between the upright members 40 and curves upwardly and outwardly to the distal end 46 on one side of the seat back 34. As shown in FIGS. 3 and 4, the housing 44 includes a coffin portion defined by side walls 54 and a bottom 56 with the side walls 54 being integral with the truss elements 52 and the cross member 42. The housing 44 further comprises a cover 58 disposed over and in sealing engagement with the side walls 54. As shown, the cover 58 is disposed on a front face of the seat back 34 but the positions of the cover 58 and the bottom 56 may be reversed so that the cover 58 faces the rear seat assembly 14. The cover 58 includes lateral tabs 60 for receiving screws which threadedly engage holes in the truss elements 52 or bosses to secure the cover 58 over the side walls 54 of the coffin portion. The cover 58 is rotated 180' from the position shown in FIG. 4 to the position shown in FIG. 3.

The cover 58 of the housing 44 includes a guideway 62 for the shoulder belt 50. The opening 48 is elongated along an axis disposed at an acute angle to the upper cross member 42 for accommodating a diagonal extension of a shoulder belt 50 over a shoulder of an occupant. To accommodate the angled exit of the seat belt 50 from the opening 48, the guideway 62 has a compound curve to prevent the edges of a shoulder belt 50 from gathering in the extension thereof from the lower end of the guideway 62 and through the curved guideway 62 to the opening 48. In other words, the compound curve is analogous to a banked or ramped race track.

The upright members 40, the cross member 42, the truss elements 52, and the side walls 54 are all rectangular in cross section with the major axes thereof extending from front to back of the seat back 34, i.e., they are plate-like with their edges facing the front and rear of the seat back 34. The major axis of the rectangular cross section of the truss elements 52 is less than the major axis of the rectangular cross section of the upright members 40, i.e., the truss elements 52 are recessed below the outward edges of the upright members 40.

The shoulder belt 50 disposed in the housing includes a reel 64 for coiling and uncoiling the shoulder belt 50. The reel 64 is attached to the cover 58 by a bracket and bolt assembly 66.

A trim component 68 is disposed over the seat back 34, the component 68 having an opening 70 therein and the distal end 46 of the housing 44 extends through the opening 70. The component 68 encompasses the entire seat back 34 but may cover only the front of the seat back 34. As illustrated, their are right and left hand seat backs 34, but to reduce components the seat backs may be identical with the distal ends 46 being on the same side in both of the front seats.

Alternatively, referring to FIGS. 5, 6, 7 and 8, another embodiment of the seat back assembly is generally shown at 100. The seat back assembly 100 comprises a pair of spaced upright members 102 each having lower ends and upper ends. A cross member 104 extends between the upper ends of the upright members 102. Each of the spaced upright members 102 and the cross member 104 have a front surface 106 and a rear surface 108. These upright members 102 and the cross member 104 define a back frame, generally shown at 110, of the seat back assembly 100. Specifically, the upright 102 and cross 104 members define an outer periphery of a substantially rectangular back frame 110. As appreciated by those skilled in the art, the back frame 100 may be of any suitable design or configuration.

A shoulder belt housing, generally shown at 112, is disposed partially within the back frame 110 and has a lower end and an upper distal end 114. The lower end is disposed between the upright members 102 and below the cross member 104 of the back frame 110. The shoulder belt housing 112 extends upwardly from below the cross member 104 to the distal end 114 disposed above the cross member 104. In the preferred embodiment, the shoulder belt housing 112 extends from one corner of the back frame 110 to an opposing corner of the back frame 110. As shown best in FIGS. 5, 6 and 8, the shoulder belt housing 112 extends from a lower left hand corner to an upper right hand corner of the back frame 110. As appreciated by those skilled in the art, this configuration is best suited for a drivers side seat back. A passenger side seat back would be reversed but otherwise identical. In other words, a passenger side seat back would have the shoulder belt housing 112 extending from the lower right hand corner to an upper left hand corner of the back frame 110.

The distal end 114 of the shoulder belt housing 112 also extends outwardly forward from the front surfaces 106 of the upright members 102 and the cross member 104. Specifically, as best shown in FIG. 7, the front surfaces 106 of the spaced upright members 102 and the cross member 104 define a frontal plane 116 of the back frame 110 and the distal end 114 of the shoulder belt housing 112 extends beyond the frontal plane 116 of the back frame 110.

Figure 2:
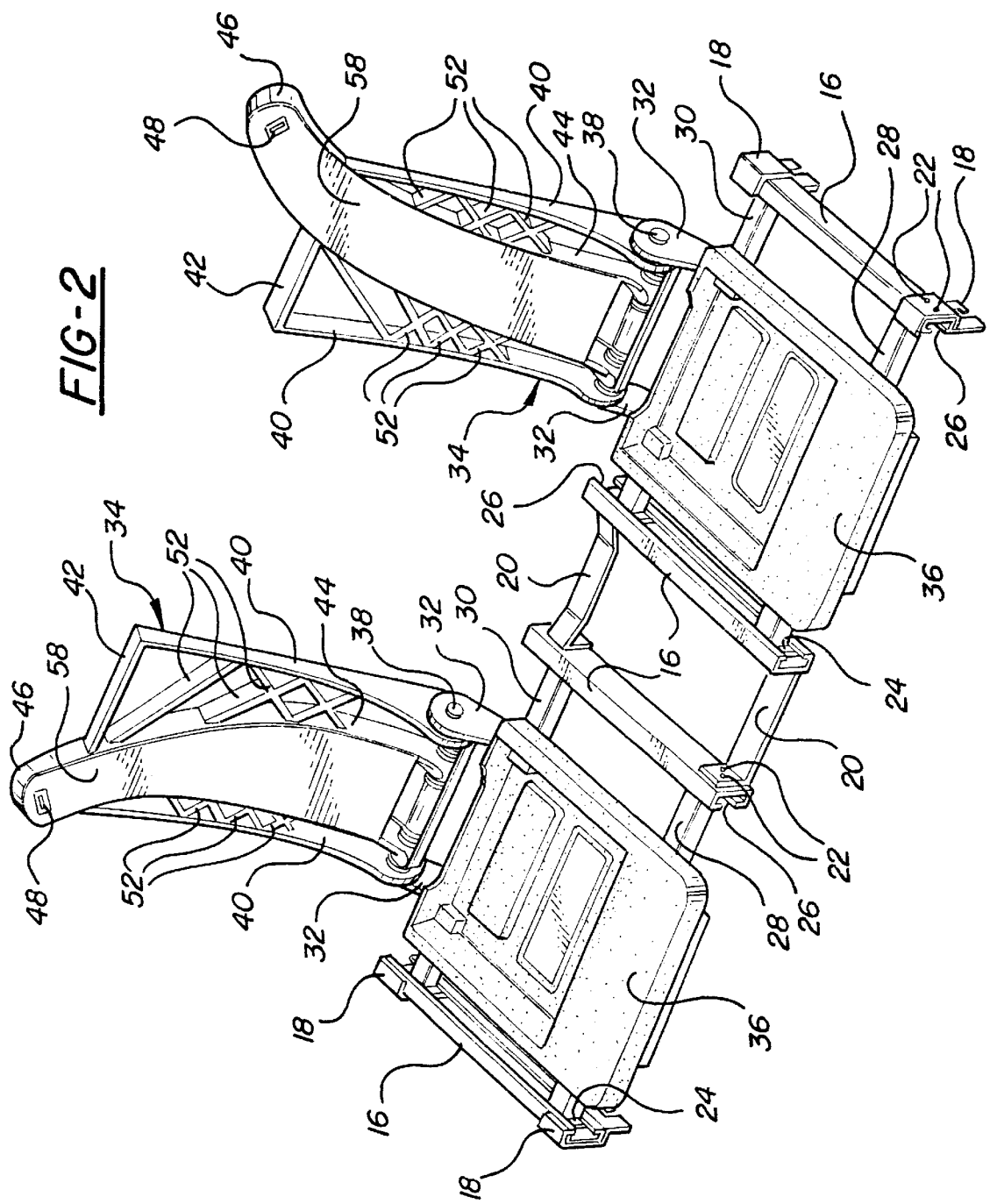
FIG. 2 is a perspective view of the support components of the front seat assembly employing the subject invention.

The back frame 110 includes structural trusses 118, 120 disposed between the upright members 102 and the shoulder belt housing 112 for providing additional support to the housing 112. In the preferred embodiment, the upright 102 and the cross 104 members and the trusses 118, 120 and the housing 112 are integrally formed of a homogenous material. A mounting member 122 is disposed at the lower ends of the upright members 102 for mounting the upright members 102 and the remaining components of the seat back assembly 100 to a seat frame as shown in FIG. 2.

The shoulder belt housing 112 includes a coffin portion 124 having side walls 126 and a bottom 128 which are integral with the trusses 118, 120, the upright members 102, and the cross member 104. One of the side walls 126 is mounted to one of the upright members 102 and then extends to the distal end 114 above the cross member 104. The other side wall 126 is mounted to the bottom of the back frame 110, turns to align with the opposing side wall 126 and then extends to the distal end 114 above the cross member 104. In the preferred embodiment, a first truss 118 extends from one of the upright members 102 to the coffin portion 124 and a second truss 120 extends from the bottom of the back frame 110 to the coffin portion 124. As appreciated by those skilled in the art, any number of trusses extending from any part of the back frame 110 could be utilized so long as the coffin portion 124 is adequately retained within the back frame 110. Preferably, the upright 102 and the cross 104 members, the trusses 118, 120, and the coffin portion 124 are rectangular in cross section with the major axes thereof extending from front to back of the seat back assembly 100, i.e., they are plate-like with their front surfaces and rear surfaces having corresponding front and rear edges facing the front and rear of the seat back assembly 100. As best shown in FIGS. 6, 7 and 8, the upright members 102 and coffin portion 124 reduce in cross section approximately ¾ of the way up the back frame 110. Hence, the cross member 104 and the first truss 118 have the reduced cross section. In addition, the side walls 126 of the coffin portion 124 that extend upward above the cross member 104 also have the reduced cross section.

A seat belt 130 is disposed within the coffin portion 124 of the housing 112. A cover 132 is disposed over the side walls 126 of the coffin portion 124. The cover 132 has an opening 134 to allow the seat belt 130 to pass therethrough. The cover 132 also has a top portion 135 that extends over the upper distal end 114 of the shoulder belt housing 112. A guide plate 136 is mounted to the top portion 135 of the cover 132 and to the distal end 114 of the shoulder belt housing 112 by a bolt 137. In other words, as shown in FIG. 7, the top portion 135 of the cover 132 is sandwiched between the guide plate 136 and the upper distal end 114 of the shoulder belt housing 112. The guide plate 136 guides the seat belt 130 from the opening 134 in the cover 132 along a front surface of the seat back assembly 100. Although not opening 134 in the cover 132, and through the guide plate 136 to overlay the front surface of the seat back assembly 100. More specifically, the seat belt 130 passes along a guideway disposed along the inside surface of the cover 132 as shown in the previous embodiment of FIG. 4. The guideway has a compound curve to accommodate the angled exit of the seat belt 130.

As discussed above, the side walls 126 of the coffin portion 124 diverge at the lower end of the shoulder belt housing 112. Hence, an enlarged opening within the coffin portion 124 is formed. A retractor 138 is mounted to the cover 132 within this winding and unwinding the seat belt 130. The mounting placement of the retractor 138 and the retractor 138 itself is best shown in the previous embodiment of FIG. 4. As shown in FIG. 5, a bolt 139 passes through the cover 132, through the retractor 138 and is secured to the bottom 128 of the coffin portion 124 for mounting the retractor 138 to the cover 132 and for mounting the cover 132 to the coffin portion 124.

Referring to FIG. 6, a support member, generally shown at 140, is mounted to the back frame 110 for supporting the back of an occupant. The support member 140 is formed as a unitary member having a planar back member 142 and a pair of spaced apart upright bolster members 144 mounted on opposite sides of the planar back member 142. A pair of bellows 146 are disposed above each bolster member 144 for allowing movement of the bolster members 144 relative to the planar back member 142. A resilient strip 148 is disposed on each bolster member 144 and provides a softer feel to the seat back assembly 100 as the sharpness of the edge of the bolster member 144 is reduced by the resilience of the resilient strip 148. The resilient strip 148 can be constructed of any suitable material such as SANIPRENE®.

The support member 140 also includes two pairs of spaced apart walls 150 and a plurality of reinforcing ribs 152. A bladder (not shown) is mounted within the spaced apart walls 150 to actuate the movement of the bolster member 144 with respect to the planar back member 142.

A recess 154 is disposed within the support member 140 for receiving and retaining a lumbar adjustment bladder 156 therein. The lumbar bladder 156 is disposed between the support member 140 and a trim cover material 158 for extending and contracting the trim cover material 158 relative to the support member 140. Once the seat back assembly 100 is assembled, the trim cover material 158 encompasses the support member 140 and at least a portion of the back frame 110. The specifics of the support member 140, lumbar bladder 156, and trim cover material 158 for this seat back assembly 100 form the subject matter of an independent invention disclosed and claimed in co-pending application Ser. No. 08/XXX,XXX, herein incorporated by reference.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An automotive seat back assembly, comprising:
    a pair of spaced upright members each having lower ends and upper ends,
    a cross member extending between said upper ends of said upright members,
    said upright members and said cross member defining a back frame,
    each of said spaced upright members and said cross member having a front surface and a rear surface,
    a shoulder belt housing having a lower end disposed between said upright members and below said cross member of said back frame, and an upper distal end disposed above said cross member and extending outwardly forward from said front surfaces of said upright members and said cross member.

2. An assembly as set forth in claim 1, wherein said front surfaces of said spaced upright members and said cross member define a frontal plane of said back frame, said distal end of said shoulder belt housing extending beyond said frontal plane of said back frame.

3. An assembly as set forth in claim 2, wherein said back frame includes structural trusses disposed between said upright members and said shoulder belt housing for providing additional support to said housing.

4. An assembly as set forth in claim 3, wherein said upright and said cross members and said trusses and said housing are integrally formed of a homogenous material.

5. An assembly as set forth in claim 3, wherein said shoulder belt housing includes a coffin portion having side walls and a bottom which are integral with said trusses, said upright members, and said cross member.

6. An assembly as set forth in claim 5, wherein said upright and said cross members, said trusses, and said coffin portion are rectangular in cross section with major axes of said rectangular cross sections of said upright and said cross members, said trusses, and said coffin portion extending from front to back of said seat back.

7. An assembly as set forth in claim 5 further including a seat belt disposed within said coffin portion of said housing.

8. An assembly as set forth in claim 7 further including a cover disposed over said side walls of said coffin portion, said cover having an opening to allow said seat belt to pass therethrough.

9. An assembly as set forth in claim 8 further including a guide plate mounted to said distal end of said shoulder belt housing for guiding said seat belt from said opening in said cover along a front surface of said seat back.

10. An assembly as set forth in claim 9 further including a retractor mounted within said coffin at said lower end of said housing for winding and unwinding said seat belt.

11. An assembly as set forth in claim 10 further including a support member is mounted to said back frame for supporting the back of an occupant.

12. An assembly as set forth in claim 11 further including a trim cover material encompassing said support member and at least a portion of said back frame.

13. An assembly as set forth in claim 12 further including a mounting member at said lower ends of said upright member for mounting said upright members to a seat frame.

14. An automotive seat back assembly, comprising:

a pair of spaced upright members each having lower ends and upper ends, a cross member extending between said upper ends of said upright members, said upright members and said cross member defining an outer periphery of a back frame, each of said spaced upright members and said cross member having a front surface and a rear surface, said front surfaces of said spaced upright members and said cross member defining a frontal plane of said back frame, a shoulder belt housing having a lower end disposed between said upright members and below said cross member behind said frontal plane of said back frame, and an upper distal end extending outwardly forward from said front surfaces of said upright members and said cross member beyond said frontal plane.

15. An assembly as set forth in claim 14, wherein said shoulder belt housing includes a coffin portion having side walls and a bottom.

16. An assembly as set forth in claim 15 further including a seat belt disposed within said coffin portion of said housing.

17. An assembly as set forth in claim 16 further including a cover disposed over said side walls of said coffin portion, said cover having an opening to allow said seat belt to pass therethrough.

18. An assembly as set forth in claim 17 further including a guide plate mounted to said distal end of said shoulder belt housing for guiding said seat belt from said opening in said cover along a front surface of said seat back.

* * * * *